United States Patent
Jaranson et al.

(10) Patent No.: US 8,668,266 B2
(45) Date of Patent: Mar. 11, 2014

(54) INTEGRATED LUMBAR FOR THIN SEAT

(75) Inventors: John W. Jaranson, Dearborn, MI (US); Marcos S. Kondrad, Macomb Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 339 days.

(21) Appl. No.: 12/834,365

(22) Filed: Jul. 12, 2010

(65) Prior Publication Data

US 2012/0007399 A1    Jan. 12, 2012

(51) Int. Cl.
*A47C 7/40* (2006.01)
*B60N 2/22* (2006.01)

(52) U.S. Cl.
USPC ............... 297/284.8; 297/284.4; 297/452.3

(58) Field of Classification Search
USPC ................. 297/284.4, 284.8, 452.3
See application file for complete search history.

(56) References Cited

U.S. PATENT DOCUMENTS

| | | | | |
|---|---|---|---|---|
| 4,316,631 A * | 2/1982 | Lenz et al. | 297/284.1 |
| 5,076,643 A * | 12/1991 | Colasanti et al. | 297/284.6 |
| 5,102,196 A * | 4/1992 | Kaneda et al. | 297/452.15 |
| 5,505,520 A * | 4/1996 | Frusti et al. | 297/284.4 |
| 5,567,011 A * | 10/1996 | Sessini | 297/284.7 |
| 6,050,641 A * | 4/2000 | Benson | 297/284.4 |
| 6,189,972 B1 * | 2/2001 | Chu et al. | 297/284.4 |
| 6,637,817 B1 * | 10/2003 | Christopher et al. | 297/284.4 |
| 6,755,467 B1 * | 6/2004 | Chu | 297/284.1 |
| 6,957,596 B2 * | 10/2005 | Kopetzky et al. | 74/501.5 R |
| 7,270,374 B2 * | 9/2007 | Moriggi | 297/284.4 |
| 7,290,837 B2 * | 11/2007 | Sugiyama et al. | 297/452.55 |
| 7,425,036 B2 * | 9/2008 | McMillen | 297/284.4 |
| 7,458,637 B2 * | 12/2008 | Norman et al. | 297/284.4 |
| 7,585,027 B2 | 9/2009 | Blendea | |
| 7,614,695 B2 | 11/2009 | Satou et al. | |
| 8,070,223 B2 * | 12/2011 | Omori et al. | 297/216.12 |
| 8,162,399 B2 * | 4/2012 | Demontis et al. | 297/284.4 |
| 8,226,165 B2 * | 7/2012 | Mizoi | 297/284.4 |
| 8,226,166 B2 * | 7/2012 | Petzel et al. | 297/284.6 |
| 8,235,467 B2 * | 8/2012 | Akutsu | 297/284.4 |
| 2010/0066136 A1 * | 3/2010 | D'Agostini | 297/216.12 |

FOREIGN PATENT DOCUMENTS

CA    2268435 A1    10/2000
WO    WO2007126089    * 11/2007

* cited by examiner

*Primary Examiner* — David R Dunn
*Assistant Examiner* — Timothy J Brindley
(74) *Attorney, Agent, or Firm* — Vichit Chea; Price Heneveld LLP

(57) ABSTRACT

A seat having a trim carrier. A flexible region includes a base portion integrally connected with the trim carrier and a distal portion. A connector includes a first end connected to the distal portion and a second end connected to a motor. Actuation of the motor draws the connector and consequently the distal portion downward toward the base portion, thereby arcing the flexible region.

18 Claims, 6 Drawing Sheets

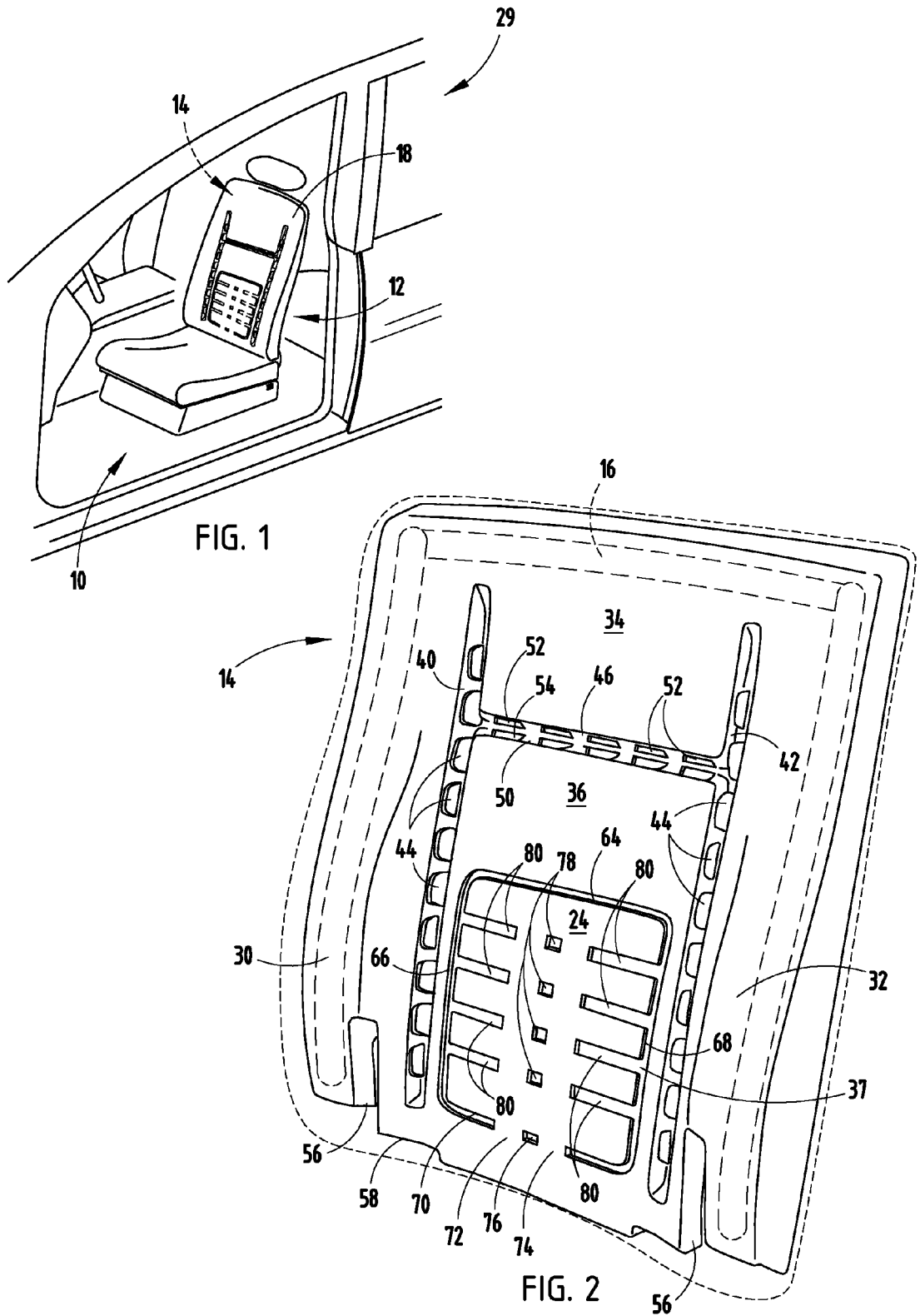

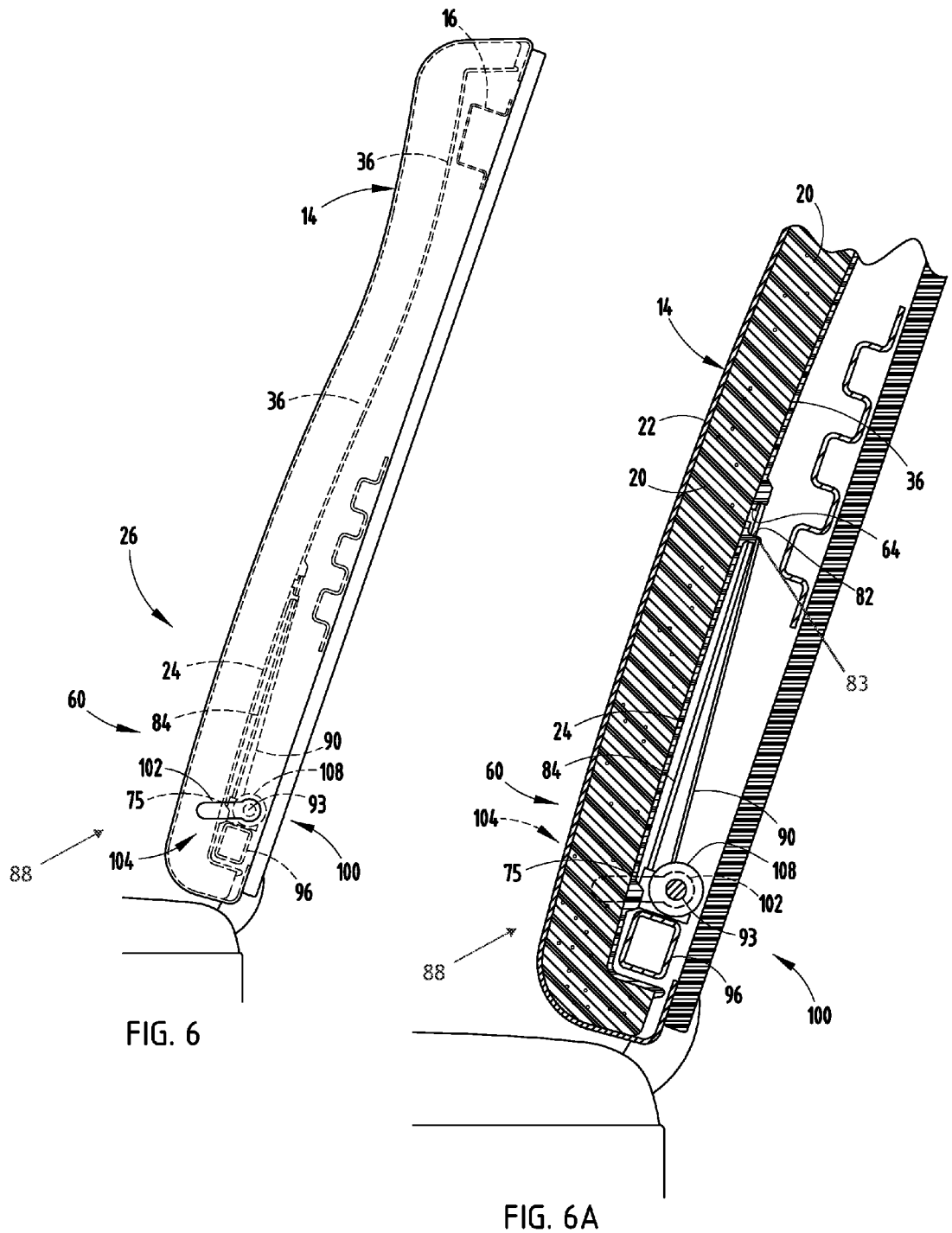

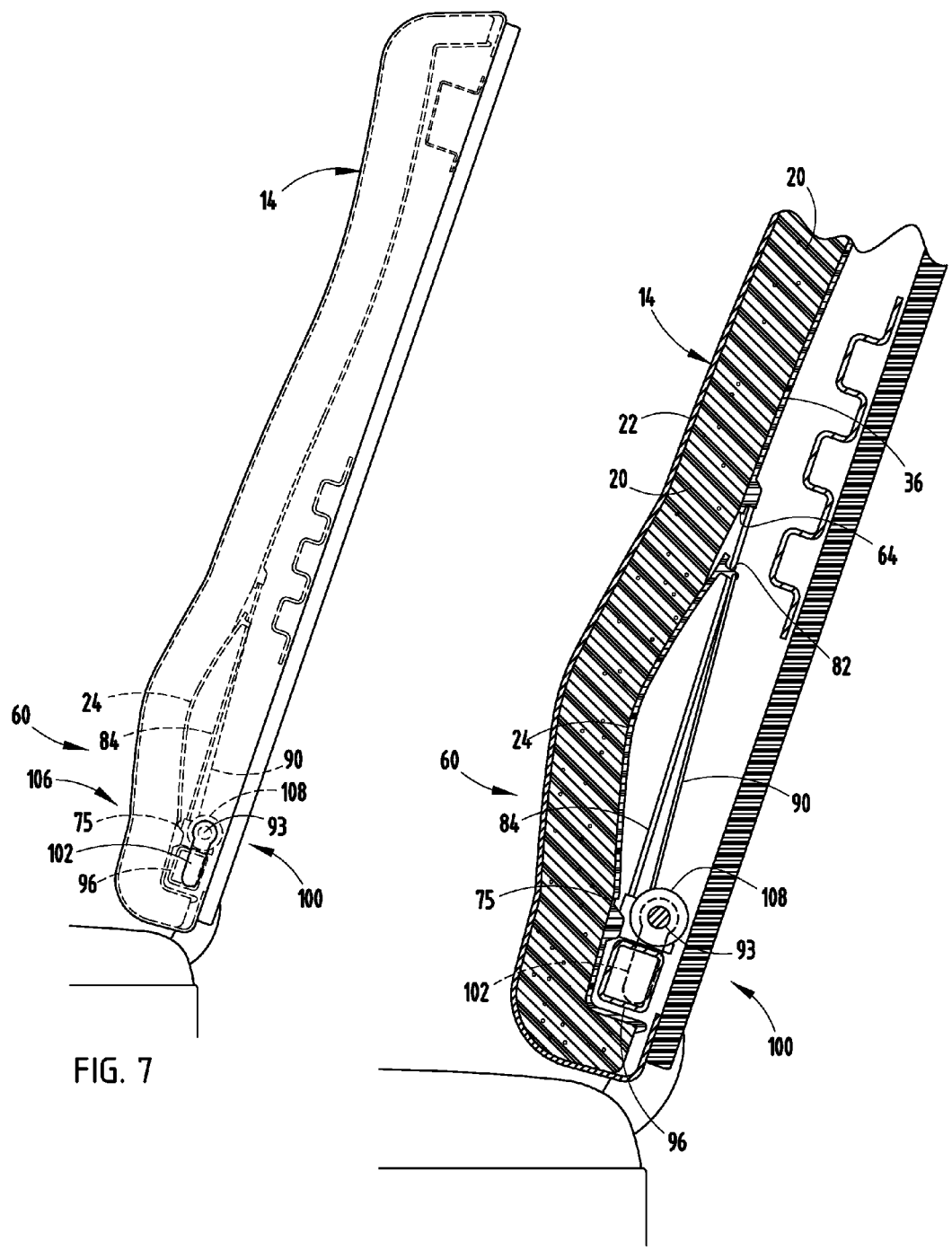

INTEGRATED LUMBAR FOR THIN SEAT

FIELD OF THE INVENTION

The present invention generally relates to an integrated lumbar for a thin seat, and more particularly relates to an integrated lumbar system that manipulates a portion of a trim carrier.

BACKGROUND OF THE PRESENT INVENTION

Lumbar systems are frequently used in a variety of seating constructions. Lumbar support provides comfort and ideal ergonomic conditions to the lower back of a user, thereby creating a pleasant experience with the seating arrangement in which the lumbar system is incorporated. In the automobile industry, lumbar systems assist a user in maximum comfort during both long and short trips and assist in minimizing back pain that can sometimes be affiliated with lack of support to the lower back of a user.

SUMMARY OF THE PRESENT INVENTION

One aspect of the present invention includes a lumbar mechanism for a seat having a trim carrier. A flexible region includes a base portion integrally connected with the trim carrier and a distal portion. A connector includes a first end connected to the distal portion and a second end connected to a motor. Actuation of the motor draws the connector and consequently the distal portion downward toward the base portion, thereby arcing the flexible region.

Another aspect of the present invention includes a seating apparatus having a seat. A seat back is operably connected to the seat and includes a back frame. A trim carrier is adjacent the back frame. A cushion is adjacent the trim carrier. A coverstock is applied over the cushion. A flexible region is disposed within the trim carrier and operable between a deployed position and a non-deployed position.

Yet another aspect of the present invention includes a vehicle seat having a seat base. A seat back is operably coupled to the seat base and includes a seat frame and a trim carrier. The trim carrier includes a flexible lumbar region. A motor is adjacent the trim carrier and is operably connected to the lumbar region by a connector.

These and other aspects, objects, and features of the present invention will be understood and appreciated by those skilled in the art upon studying the following specification, claims, and appended drawings.

BRIEF DESCRIPTION OF THE DRAWINGS

FIG. 1 is a top perspective view of one embodiment of a seat in which an integrated lumbar system is incorporated;

FIG. 2 is a top perspective view of one embodiment of a trim carrier having a flexible region;

FIG. 4A is a side elevational partial cross-sectional view of the seat back of FIG. 4;

FIG. 6 is a side elevational view of a seat incorporating another embodiment of an integrated lumbar system of the present invention in a non-deployed position;

FIG. 6A is a side elevational partial cross-sectional view of the seat back of FIG. 6;

FIG. 7 is a side elevational view of the seat back of FIG. 6 with the integrated lumbar system in a deployed position; and FIG. 7A is a side elevational partial cross-sectional view of the seat back of FIG. 6.

DETAILED DESCRIPTION OF EMBODIMENTS

Figure 3:
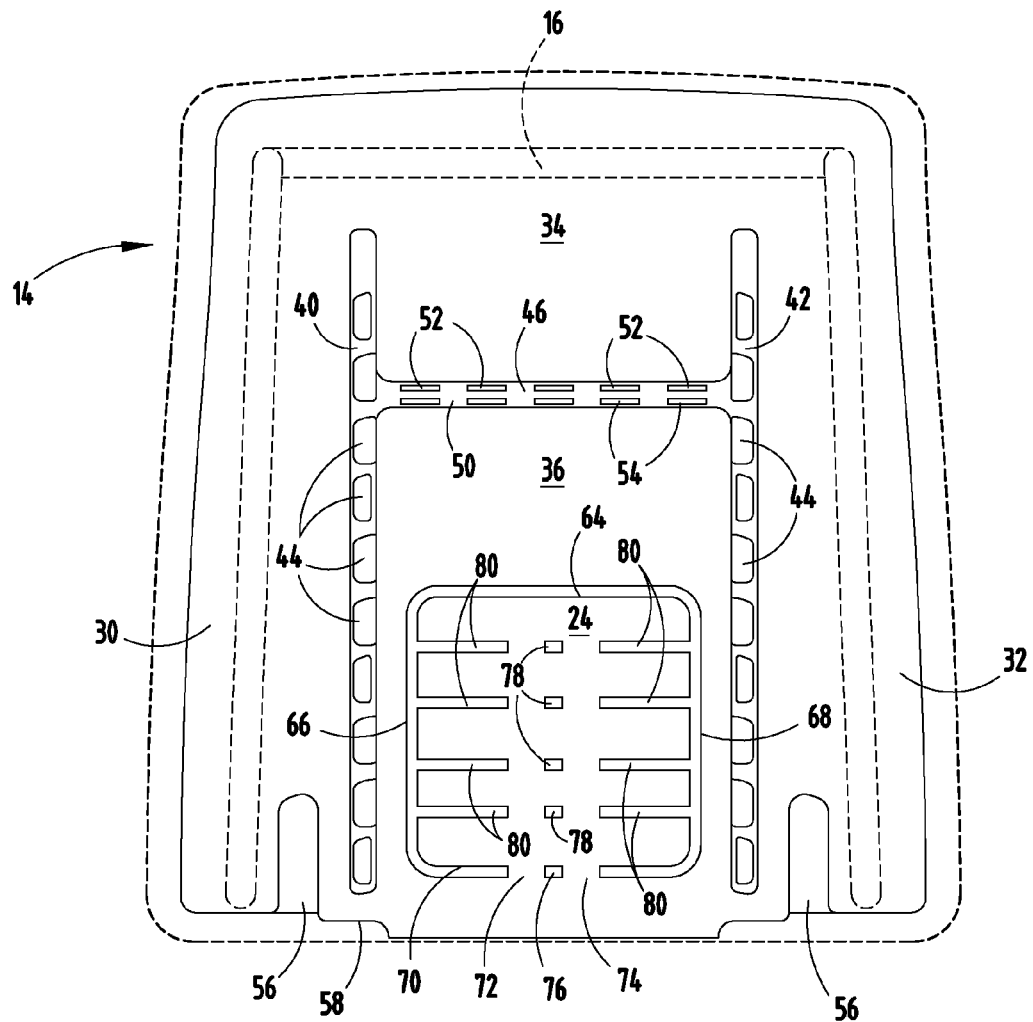
FIG. 3 is a front elevational view of the trim carrier of FIG. 2.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1 and 2, the reference numeral 10 generally designates a seating apparatus having a seat 12 and a seat back 14. The seat back 14 is operably connected to the seat 12 and includes a back frame 16. A trim carrier 18 is adjacent the back frame 16 and a cushion 20 (FIG. 4A) is adjacent the trim carrier 18. A coverstock 22 (FIG. 4A) is applied over the cushion 20. A flexible portion 24 is disposed within the trim carrier 18 and operable between a non-deployed position 26 (FIG. 4) and a deployed position 28 (FIG. 5).

The trim carrier 18 is specifically designed to provide comfort to the back of a seated user and may be used in any seat of a vehicle 29. The trim carrier 18, cushion 20, and coverstock 22 act as a unit that conforms to the body shape of a seated user. When a user sits on the seat 12 and rests against the seat back 14, the seat back 14 flexes to accommodate the weight and shape of the user, as outlined in further detail below. It is generally contemplated that the trim carrier 18 will be injection molded and made from a flexible polymer or fiberglass.

Referring again to FIGS. 1 and 2, the trim carrier 18 includes first and second side portions 30, 32 integrally formed with a top portion 34. The first and second side portions 30, 32 wrap around the back frame 16, which extends behind the trim carrier 18. The trim carrier 18 also includes a mid-portion 36 substantially separated from the first and second side portions 30, 32 by first and second vertical elongate slots 40, 42. The mid-portion 36 is flexible and includes a central cavity 37 in which the flexible portion 24 is disposed. The vertical elongate slots 40, 42 have a plurality of flex apertures 44 that deform when the back of a user applies pressure to the trim carrier 18. The vertical elongate slots 40, 42 include an elongate web 46 that extends through the flex apertures 44 to provide some rigidity and structural integrity to the flex apertures 44. When pressure is applied to the first side portion 30 or the second side portion 32, the first side portion 30 or the second side 32 rotates slightly relative to the mid-portion 36, thereby providing a flexible surface that, together with the cushion 20 and coverstock 22, engages and comforts the back of a user.

Referring again to FIG. 2, the first and second vertical elongate slots 40, 42 are connected by a horizontal elongate slot 50 that also includes a plurality of flex apertures 52. An elongate web 54 extends through the flex apertures 52. In the illustrated embodiment, there are two horizontal rows of flex apertures 52 that allow for increased bending of the trim carrier 18 at the horizontal elongate slot 50 about a horizontal axis. It is contemplated that more or less rows of flex apertures 52 may be applied, depending on the desired flexibility of the trim carrier 18 at the horizontal elongate slot 50. The horizontal elongate slot 50 allows slight flexure of the top portion 34 of the trim carrier 18 relative to the mid-portion 36 of the trim carrier 18. Specifically, the horizontal elongate slot 50 allows the top portion 34 to deflect slightly forward or rearward relative to the mid-portion 36, thereby providing additional comfort to the back of a user. Engagement slots 56 are positioned on a bottom portion 58 of the trim carrier 18 and are adapted to allow proper interface of the seat 12 to the seat back 14.

Figure 4:
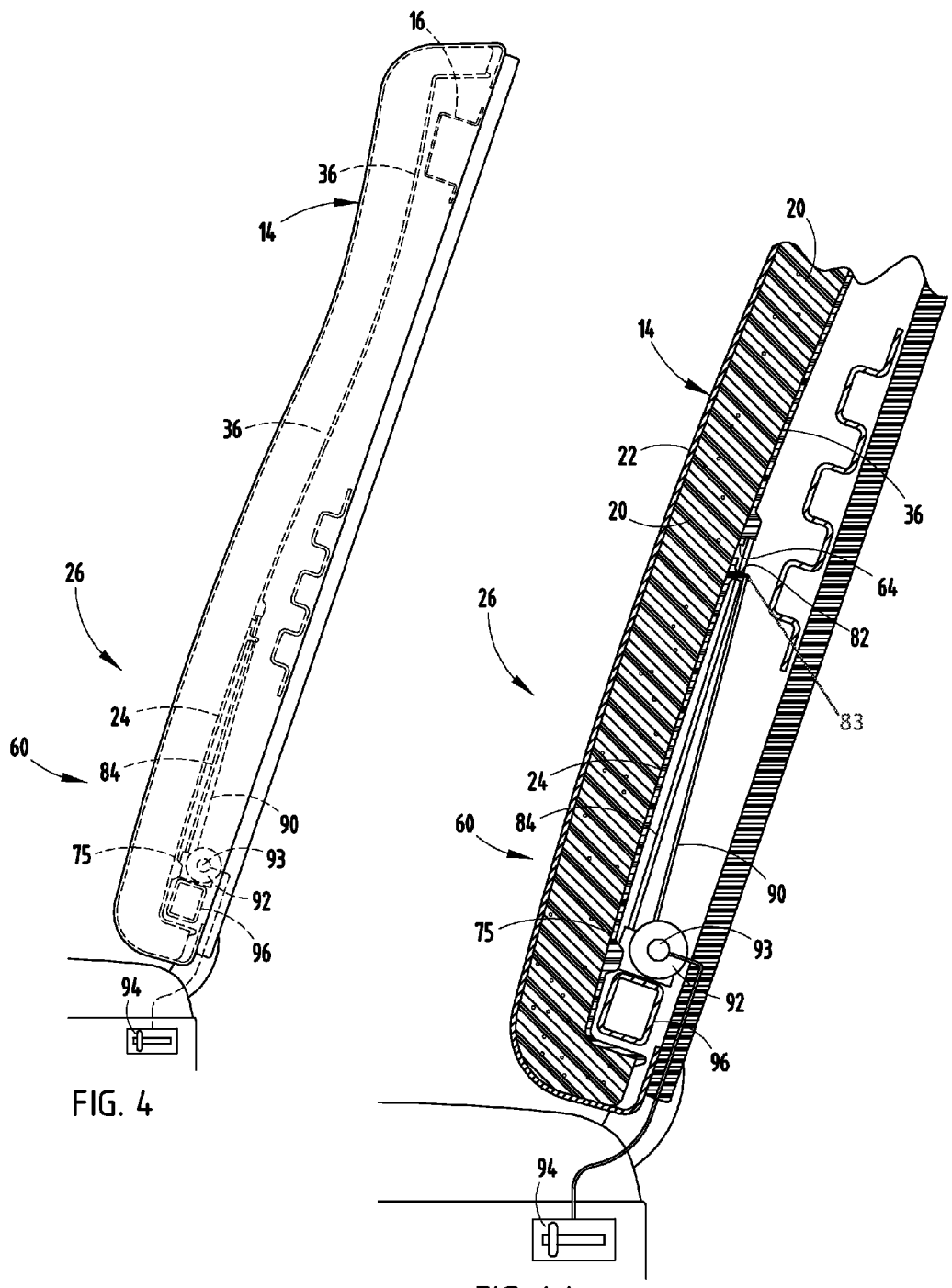
FIG. 4 is a side elevational view of a seat incorporating one embodiment of an integrated lumbar system of the present invention in a non-deployed position.
Figures 5, 5A:
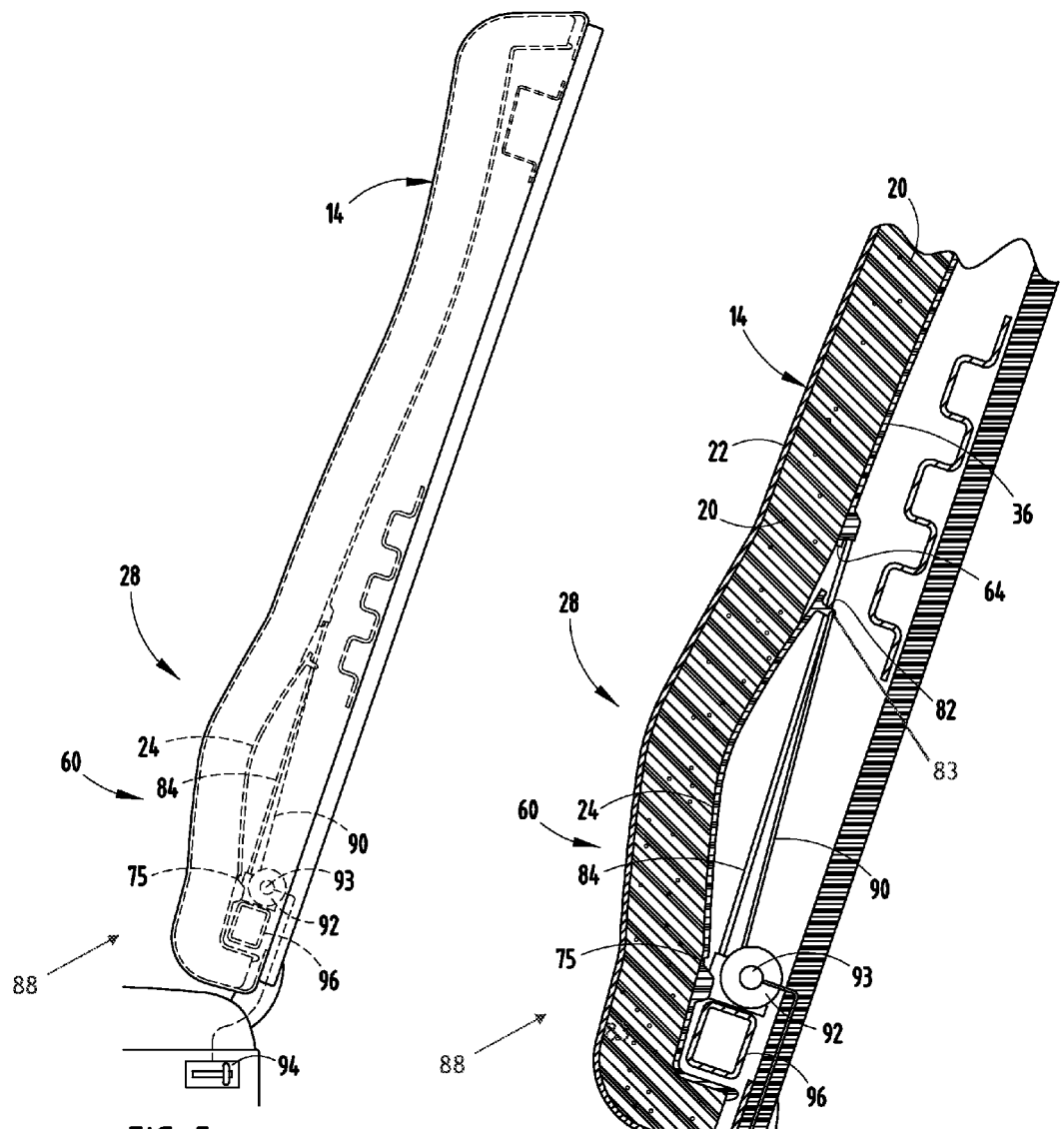
FIG. 5 is a side elevational view of the seat back of FIG. 4 with the integrated lumbar system in a deployed position.
FIG. 5A is a side elevational partial cross-sectional view of the seat back of FIG. 5.

Referring now to FIGS. 3 and 4, the mid-portion 36 of the trim carrier 18 includes an integrated lumbar device 60. The integrated lumbar device 60 has the flexible portion 24 integrally connected with the mid-portion 36 of the trim carrier 18. It is contemplated that the flex portion 24 may be connected to the mid-portion 36 of the trim carrier 18 on a top side 64, first side 66, second side 68, or bottom side 70 of the flex portion 24. However, it is also possible for the flex portion 24 to be connected on a single side of the flex portion 24.

In the illustrated embodiment shown in FIGS. 2-4, the flex portion 24 is integrally connected with the mid-portion 36 at the bottom side 70 of the flex portion 24 at first and second connectors 72, 74. The first and second connectors 72, 74 form a flexible living hinge 75 that allows for movement of the flex portion 24, as will be described in further detail below. The connectors are separated by a base aperture 76. A plurality of vertically-aligned apertures 78 are disposed above the base aperture 76, and effectively lighten the weight of the trim carrier 18, while at the same time provide additional flexibility to the flex portion 24. Slots 80 are disposed on the first and second sides 66, 68 of the flex portion 24 that allow for bending of the flex portion 24 about a horizontal axis, as outlined in further detail below. The flex portion 24 and trim carrier 18 are constructed from a strong lightweight and resilient material that is flexible, but which will return to its original position after flexing.

Referring to FIGS. 4 and 4A, the top side 64 of the flex portion 24 includes a rearwardly extending arm 83 having a guide aperture 82 adapted to receive a guide member 84. The guide member 84 is disposed behind the trim carrier 18. The guide member 84 extends from the mid-portion 36 down to the bottom of the trim carrier 18. The guide aperture 82 is slidably engaged with the guide member 84, such that the guide aperture 82 and the top side 64 of the flex portion 24 may be moved upward and downward between the deployed position 28 and the non-deployed position 26, respectively. As shown in FIGS. 3 and 3A, when the flex portion 24 is in the non-deployed position 26, a side profile of the trim carrier 18 and the flex portion 24 maintain relatively consistent linear alignment. Consequently, the cushion 20 and the coverstock 22 also maintain substantially consistent linear alignment.

Referring now to FIGS. 4-5A, a cable 90 is attached to the top side 64 of the flex portion 24 and also operably connected with an actuation device 88 in the form of a reel 93 of a motor system 92. When the motor system 92 is activated, the reel 93, connected with the motor system 92, rotates counterclockwise, which causes the cable 90 to draw inward and rotate around the reel 93. Consequently, the amount of cable 90 between the top side 64 of the flex portion 24 and the motor system 92 lessens, which causes the top side 64 of the flex portion 24 to draw downward. As the top side 64 of the flex portion 24 draws downward, the guide aperture 82 at the top side 64 of the flex portion 24 is guided downward by the guide member 84, such that the flex portion 24 begins to bow outwardly and hinge at the living hinge 75, as shown in FIGS. 5 and 5A. The living hinge 75 is constructed from the same material as the trim carrier 18, and it is contemplated that the living hinge 75 can be hinged for the entire life of the vehicle seat 12 and life of the vehicle without needing to be replaced. Additional flexibility is provided by the slots 80 in the flex portion 24. As the flex portion 24 bows outwardly, the cushion 20 and the coverstock 22 also bow outwardly, thus providing added support to the lower back of a user.

Referring again to FIGS. 4-5A, a toggle switch 94 that is operably connected with the motor system 92 can stop the motor system 92 at any position between the fully deployed position 28 and fully non-deployed position 26 to maximize comfort. The motor system 92 is positioned above a lower frame member 96 disposed inside the seat back 14, and thus extra room below the seat 12 is not necessary. In the event the user wishes to lessen the lumbar support, then the toggle switch 94 is reversed, which consequently causes the motor system 92 to rotate the reel 93 in a clockwise direction, thus unreeling the cable 90 that was drawn in during the counterclockwise operation of the motor system 92. The flex portion 24 is biased to the non-deployed position 26 and will eventually reestablish linear alignment with the trim carrier 18.

Referring now to FIGS. 6-7A, yet another embodiment of the present invention includes the actuation device 88 having a lever system 100 having a lever 102 that is operably connected with the cable 90, and consequently the flex portion 24. In operation, when the lever 102 of the lever system 100 is in a raised position 104 (FIGS. 6 and 6A), the cable 90 is in an unloaded condition, such that the flex portion 24, as well as the cushion 20 and coverstock 22, maintain a substantially linear orientation. When the lever 102 of the lever system 100 is rotated downward to a lowered position 106 (FIGS. 7 and 7A), the cable 90 is wound, at least partially, about the reel 93, which shortens the amount of exposed cable 90. Consequently, the top side 64 of the flex portion 24 is drawn downward. At the same time, the flex portion 24 bulges outwardly, thereby pushing the cushion 20 and coverstock 22 outwardly into a back supporting condition. The lever 102 of the lever system 100 is operably connected with a friction disc 108 that effectively holds the lever 102 in any of a plurality of positions. Consequently, the flex portion 24 may be set at any of a variety of lower back supporting conditions that allows for comfort to the back of different users of varying sizes and shapes. It is contemplated that a variety of other mechanisms could be incorporated into the lever system 100 to hold the lever 102 in a variety of fixed positions as would be understood by one having ordinary skill in the art. Both the lever system 100, as well as the motor system 92, are disposed into the seat back 14. As a result, the need for additional space around or below the seating apparatus 10 that would otherwise be needed by activating devices of this kind is minimized.

The present invention provides a lumbar device that is comfortable to a user and that minimizes the overall thickness of a seat back 14. In addition, the actuating device, which may include the motor system 92 or the lever system 100, among other possible options, is incorporated in the seat back 14, thus eliminating additional space above or below the seat 12 that would otherwise be needed to accommodate the actuating mechanism. Furthermore, the inclusion of a flex region as an integral part of the trim carrier 18 allows for ease of manufacture and installation of the trim carrier 18 into the seat back 14. As a result, a lightweight seat 12 and seat back 14 are provided that are comfortable and designed for extended use over a long period of time.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A lumbar mechanism for a seat comprising:
a trim carrier defining a central cavity;
a flexible region disposed in the central cavity having a bottom portion integrally connected with the trim carrier via a living hinge;
a continuous peripheral gap extending around the flexible region between the trim carrier and the flexible region that is interrupted only by the living hinge;
a rearwardly extending arm projecting from a top portion of the flexible region and slidably coupled with a vertical guide and a tension cable; and
a motor operably coupled to the tension cable, wherein actuation of the motor draws the rearwardly extending arm and cable downward along the vertical guide, thereby arcing the flexible region.

2. The lumbar mechanism of claim 1, wherein the motor is disposed adjacent to the trim carrier.

3. The lumbar mechanism of claim 1, further comprising:
a plurality of lateral slots disposed in the flexible region.

4. The lumbar mechanism of claim 1, wherein the motor is operably connected to an external control mechanism.

5. A seating apparatus comprising:
a seat back including:
a trim carrier adjacent a back frame, the trim carrier including a central portion defining a central cavity;
a cushion adjacent the trim carrier;
a coverstock applied over the cushion; and
a flexible region disposed in the central cavity and defining a plurality of horizontal flex slots integral with a continuous uninterrupted peripheral gap that is disposed on three sides of the flexible region between the trim carrier and the flexible region, the flexible region being integrally connected with the trim carrier at a base portion thereof and operable between non-deployed position, wherein the planar extent of the flexible region and the planar extent of the central portion are substantially co-planar, and a deployed position, wherein the flexible region arcs forward relative to the trim carrier;
a rearwardly extending arm projecting from a top portion of the flexible region, fixedly coupled with a cable and slidably with a vertical guide; and
an actuation device operably coupled to the cable and configured to draw the cable and consequently the top portion of the flexible region downward.

6. The seating apparatus of claim 5 wherein the flexible region is connected to the trim carrier via a living hinge.

7. The seating apparatus of claim 6, wherein the living hinge is disposed at the base portion of the flexible region.

8. The seating apparatus of claim 7, wherein the actuation device includes an actuating motor operably coupled to the flexible region and operable to move the flexible region between the deployed and non-deployed positions.

9. The seating apparatus of claim 8, further comprising:
a spool operably coupled with the cable.

10. The seating apparatus of claim 5, wherein the motor is disposed in the seat back adjacent to the trim carrier.

11. The seating apparatus of claim 8, wherein the motor is operably connected to an external control mechanism.

12. The seating apparatus of claim 5, wherein the flexible region is disposed between elongate vertical slots in the trim carrier.

13. A vehicle seat comprising:
a seat back including:
a seat frame; and
a trim carrier having a central cavity with a flexible lumbar region disposed therein that is integrally connected to the trim carrier with a continuous uninterrupted peripheral gap that is disposed on three sides, wherein the flexible lumbar region includes a rearwardly extending arm slidably coupled with a vertical guide and a cable; and
an actuation device that draws the cable and rearwardly extending arm downward along the guide to arc the flexible lumbar region.

14. The vehicle seat of claim 13, wherein the flexible region is connected to the trim carrier via a living hinge.

15. The vehicle seat of claim 13, further comprising:
a plurality of lateral slots disposed in the flexible region.

16. The vehicle seat of claim 13, wherein a motor is operably connected to an external control mechanism.

17. The vehicle seat of claim 13, wherein the flexible region is disposed between elongate vertical slots in the trim carrier.

18. The vehicle seat of claim 15, further comprising:
a foam pad layer disposed over the trim carrier and a coverstock disposed over the foam pad layer.

* * * * *